United States Patent [19]
Iwashita

[11] Patent Number: 5,406,182
[45] Date of Patent: Apr. 11, 1995

[54] METHOD FOR CONTROLLING A SERVOMOTOR

[75] Inventor: Yasusuke Iwashita, Oshino, Japan

[73] Assignee: Fanuc Ltd., Yamanashi, Japan

[21] Appl. No.: 122,543

[22] PCT Filed: Jan. 26, 1993

[86] PCT No.: PCT/JP93/00091
§ 371 Date: Sep. 30, 1993
§ 102(e) Date: Sep. 30, 1993

[87] PCT Pub. No.: WO93/16424
PCT Pub. Date: Aug. 19, 1993

[30] Foreign Application Priority Data
Feb. 5, 1992 [JP] Japan .................................. 4-47704

[51] Int. Cl.⁶ .............................................. G05B 11/01
[52] U.S. Cl. ........................................ 318/560; 318/571;
318/600; 318/569; 318/568.18
[58] Field of Search ............... 318/560, 571, 600, 569,
318/560.18

[56] References Cited
U.S. PATENT DOCUMENTS
3,958,109 5/1976 Doherty et al. .................... 318/569
5,248,921 9/1993 Kato et al. .......................... 318/560

FOREIGN PATENT DOCUMENTS
63-73310 4/1988 Japan .
2-85906 3/1990 Japan .
3-15911 1/1991 Japan .

OTHER PUBLICATIONS
English translation of International Search Report, Apr., 1993.

Primary Examiner—William M. Shoop, Jr.
Assistant Examiner—Karen Masih
Attorney, Agent, or Firm—Staas & Halsey

[57] ABSTRACT

A method for controlling a servomotor, in which the differences in dynamic characteristics among machines are absorbed by the controller so as to substantially equalize the response characteristics of the machines. An advance smoothing processing is executed before each position-speed loop processing cycle. The position feedforward amount FFp is calculated according to the following equation:

$$FFp = \alpha\{(1-K)\,SMD_0 + kSMD_1\}.$$

Where, $SMD_0$ represents a smoothing data of the present cycle; $SMD_1$, a smoothing data of the preceding cycle; and $\alpha$, a position feedback coefficient. The parameter $k$ given in the above equation is adjusted to adjust the response characteristics of the individual machines, as well as the response characteristic of the mechanical system including controller with respect to an operation command. With this adjustment, the dynamic characteristics can be equalized between two or more machines even when such machines are simultaneously interpolated.

4 Claims, 7 Drawing Sheets

METHOD FOR CONTROLLING A SERVOMOTOR

BACKGROUND OF THE INVENTION

The present invention relates to a method of controlling a servomotor for actuating feed shafts of a machine tool or robot arms, and more particularly, to a feedforward control for a servomotor.

DESCRIPTION OF THE RELATED ART

When controlling feed shafts of the machine tool or robot arms by the servomotor, especially when carrying out high-speed cutting operation by the machine tool, shape errors usually occur due to time lag in following-up of the servo system. Thus, to reduce the positional deviation and correct the servo delay, a feedforward control used to be incorporated into the position loop. For such feedforward control, in each of position-speed processing cycles, a shift command is differentiated. Then, this differentiated value is multiplied by a feedforward coefficient and added to a speed command obtained by the ordinary position loop processing for correcting the speed command. Then, the speed loop processing is executed on the basis of this corrected speed command.

A typical distribution cycle (ITP cycle), which is generally defined by a time required for transmitting a shift command from a numerical control apparatus to the servo system, i.e., to a position loop, is about 8 msec. Typical cycles of the position loop and the speed loop cycles are 2 msec to 1 msec respectively. In the position loop, the ITP cycle is equally divided, so that the shift command supplied from the numerical control device is evenly given to each position loop cycle.

Consequently, even if an acceleration/deceleration time constant is occasionally added to the shift command outputted from the numerical control device, the shift command is equally modified in each position-speed loop cycle Ts within the same ITP cycle. In other words, the shift command remains constant within the same ITP cycle at a value determined by the given acceleration/deceleration time constant. Thus, the value of the shift command varies largely immediately before and after the ITP cycle goes to the next cycle.

It is feared that this sudden change may become a significant large value. If this value is differentiated in a feedforward term, it will become larger. Thus, the speed command will contain a high frequency component. It will, therefore, become unable to be followed up in the speed loop. Hence, the positional deviation will cause hunting phenomenon, thereby further causing a motor or a machine to be accompanied by a significantly large shock.

To overcome this kind of drawback, the inventor of the present invention has proposed a method of controlling a servomotor with a smoothing operation (i.e. smoothing processing) wherein the hunting phenomenon is eliminated by inserting an acceleration/deceleration processing into the feedforward term of the position control and speed control, as disclosed in the International Application (PCT/JP90/00380) which was later published as WO90/11562.

The present inventor has further improved the servomotor control method and developed a method by employing an advance smoothing processing, in which, unlike the case of the aforementioned smoothing method characterized by a mere averaging of the past data, the shift commands of the position/speed loop cycle coming before and after the relevant ITP cycle are averaged by using the shift command to be outputted after the relevant ITP cycle. The value obtained through this advance smoothing processing, as a feedforward quantity, is added to the speed command obtained through the ordinary position loop processing (Refer to the international Application PCT/JP92/00666 and PCT/JP92/01150).

According to the advanced-smoothing processing an average value A of the shift commands is obtained by the following equation (1). Thus obtained average value is multiplied by a feedforward coefficient $\alpha$, and the product is used as a position feedforward amount.

$$A = Z^d (1 + Z^{-1} + \cdots + Z^{-(N-1)}) \cdot (\text{shift command amount})/N \quad (1)$$

Where, N represents a value obtained by dividing the ITP cycle by the position-speed loop cycle; $Z^{-1}$, a delay corresponding to one position-speed loop processing cycle; and $Z^d$, an element for advancement. A value d is approximately a half of N. For example, d will be "3" or "4" where N=8.

Furthermore, as another advanced-smoothing processing for obtaining a smoothing data equivalent to the above equation (1), the above publications, PCT/JP92/00666 and PCT/JP92/01150, disclose a method of utilizing before and after shift commands of the ITP cycles as well as a present shift command.

Above-described feedforward control may be applied in a case where two or more axles are simultaneously interpolated. If the axles have the same feedforward coefficients, the characteristics of these axles would be identical with each other under the stationary condition, for example, after reaching a predetermined speed. However, during a transient condition such as acceleration or deceleration, the dynamic characteristics of these axles cannot be equalized completely due to the difference of mechanical rigidity. In other words, the conventional control method is characterized by equalizing the dynamic characteristics of respective axle controllers.

Thus, if a control speed is slow and the difference of dynamic characteristics of machines to be controlled can be ignored, it will be possible for the respective axles to respond in the same manner because the controller characteristics are the same among them. However, once the control speed is increased until a large acceleration is generated, the same response will no longer be obtained due to the difference of mechanical characteristic.

SUMMARY OF INVENTION

The present invention provides a method for controlling servomotors by which a plurality of axles respond in the same manner even if these axles are different from each other in their mechanical characteristics such as rigidity.

According to the present invention, a smoothing data of the shift command is obtained by executing an advance smoothing processing in each of position-speed loop cycles, and, in order to correct a speed command, a position feedforward amount FFp is calculated according to the following equation:

$$FFp = \alpha\{(1-k) SMD_0 + k \cdot SMD_1\}$$

where $SMD_0$ represents a smoothing data corresponding to a present position-speed loop processing; $SMD_1$ a smoothing data corresponding to one preceding cycle of position-speed loop processing; $\alpha$, a feedforward coefficient; and k, a parameter.

In this case, the parameter k is determined so that the desired dynamic characteristics of machines constituting a mechanical system including the servomotor can be obtained with respect to a shift command.

Furthermore, according to the present invention, instead of $SMD_1$ representing the smoothing data corresponding to the one preceding cycle of position-speed loop processing, $SMD_{-1}$ representing a smoothing data corresponding to one delayed cycle of position-speed loop processing may be used to calculate the position feedforward amount FFp according to the following equation:

$$FFp = \alpha\{(1-k) SMD_0 + k \cdot SMD_{-1}\}$$

This position feedforward amount FFp is used to correct the speed command, by which the servomotor is controlled.

DETAILED DESCRIPTION OF THE PREFERRED EMBODIMENT

Figure 1:
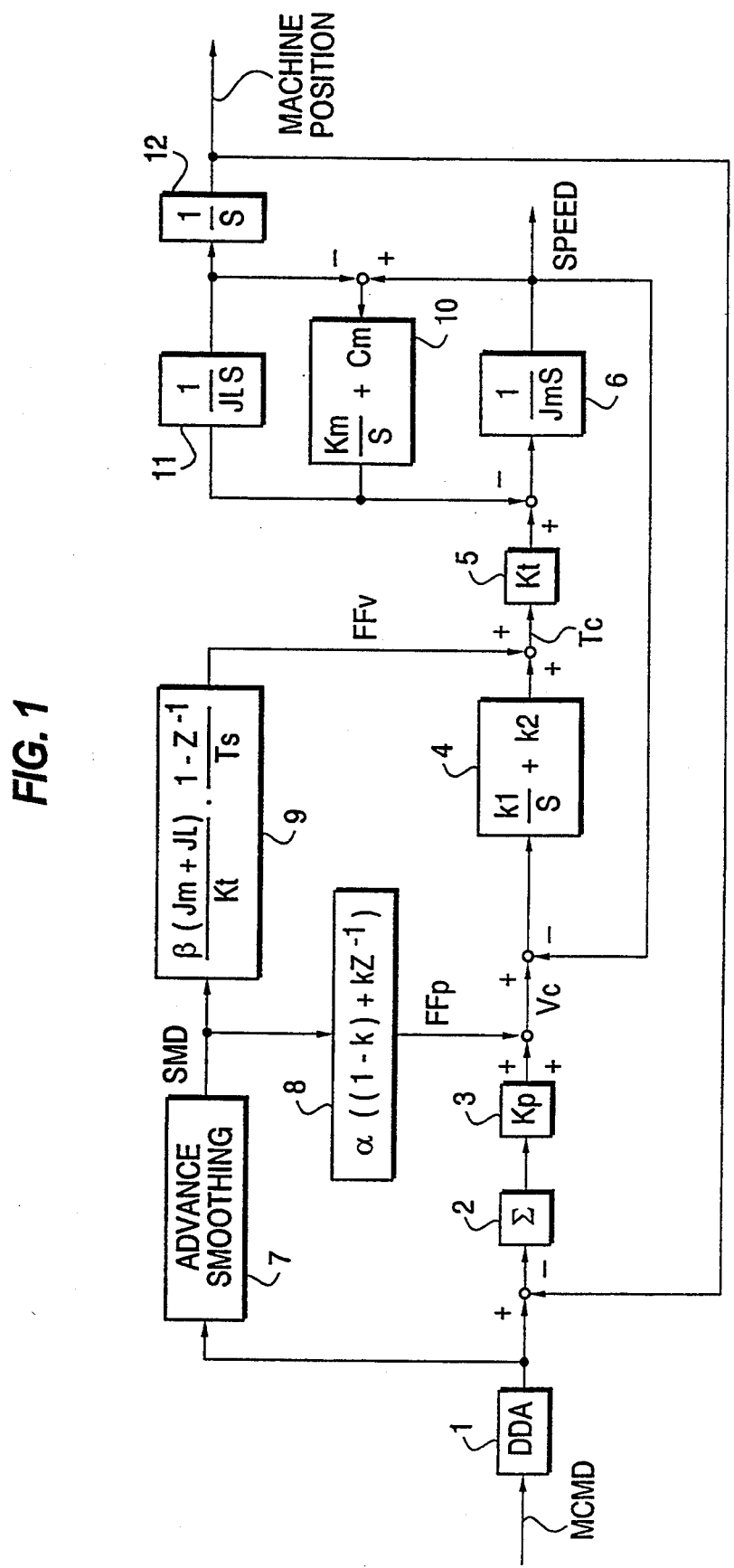
FIG. 1 is a block diagram of the servo system for performing a feedforward control in accordance with the present invention.

In a block diagram of a servo system shown in FIG. 1, a DDA (Digital Differential Analyzer) 1 divides a shift command Mcmd, which is sent from CNC (i.e. numerical control apparatus equipped with a built-in computer), into a plurality of shift commands corresponding to position-speed loop processing cycles Ts in each distribution cycle (i.e. ITP cycle). A positional deviation is obtained by subtracting a shift amount of the servomotor from a shift command outputted from the DDA 1 in each position-speed loop processing cycles and added up in an error counter 2. A reference numeral 3 represents a term for obtaining a speed command by multiplying a position gain Kp by a positional deviation stored in the error counter 2. A reference numeral 4 represents a speed loop term, wherein k1 is an integral constant, and k2 a proportional constant. Reference numerals 5 and 6 represent terms for transfer function, wherein Kt is a torque constant, and Lm a motor inertia. Reference numerals 10 and 11 represent terms for transfer function for a machine connected to the servomotor, wherein Km is a spring constant, Cm a factor of viscosity, and JL an inertia of the machine. Furthermore, a reference numeral 12 represents a term for transfer function which converts speed to position.

A reference numeral 7 represents a term for advanced-smoothing processing. A reference numerical 8 represents a term for obtaining the position feedforward amount FFp on the basis of the smoothing data SMD obtained by the advanced-smoothing means, wherein k represents a parameter which is varied depending on the characteristic of the machine connected to the servomotor, and $\alpha$ represents a position feedforward coefficient. A reference numeral 9 represents a section for obtaining a speed feedforward amount FFv by differentiating the smoothing data SMD. In other words, the speed feedforward amount FFv is determined by obtaining the difference between a smoothing data $SMD_0$ of the present cycle and a smoothing data $SMD_1$ of the one preceding cycle. By the way, a cycle of the position-speed loop is generally denoted by Ts.

The numerical control apparatus such as CNC generates the shift command Mcmd in each ITP cycle, and the DDA 1 obtains the shift command in each position-speed loop processing cycle Ts. The error register 2 obtains a positional deviation on the basis of the shift command of DDA 1 and an actual position feedback amount. Then, the positional deviation is multiplied by the position gain Kp to obtain a speed command Vcl. On the other hand, the advanced smoothing means 7 provides the smoothing data SMD according to the previously described equation (1) by using the present, preceding and following the shift commands Mcmd of ITP cycles. Then, based on thus obtained smoothing data SMD, further calculation for obtaining the position feedforward amount FFp will be carried out according to the following equation (2) (Processing of the term 8).

$$FFp = \alpha\{(1-k) + kZ^{-1}\} \cdot SMD \quad (2)$$
$$= \alpha\{(1-k) SMD_0 + kSMD_1\}$$

Where, $SMD_0$ represents a smoothing data obtained in the present position-speed loop processing cycle Ts; $SMD_1$, a smoothing data obtained in the one preceding position-speed loop processing cycle; and $\alpha$, a feedforward coefficient. The parameter k is determined so as to obtain the desired response characteristics of the servo system with respect to a command from the numerical control apparatus, wherein the response characteristics includes the dynamic characteristics of the servomotor and the machine driven by the servomotor.

Adding this position feedforward amount FFp to the speed command Vcl obtained through the above-described position loop processing will give a speed command Vc by which the position feedforward control is to be executed. An actual speed feedback amount supplied from the servomotor is subtracted from the speed command Vc to obtain a speed deviation. Then, a torque command Tc1 is obtained by executing a speed loop processing in the same manner as in the conventional method.

Further, the speed feedforward amount FFv is obtained in the following manner: first, the smoothing data SMD is differentiated; (For obtaining the differential value, the smoothing data of the preceding cycle is subtracted from the smoothing data of the present cycle.) then, the obtained differential value is multiplied by a constant $(Jm+JL)/Kt$, which is dependent on the torque constant Kt of the servomotor, inertia Jm and inertia JL of the machine connected to the servomotor, and speed feedforward coefficient $\beta$ to obtain the speed feedforward amount. That is, the speed feedforward amount FFv can be obtained by using the following equation (3):

$$FFv = \{\beta(Jm + JL)/Kt\}\{(1 - Z^{-1})/Ts\}SMD \\ = \{\beta'(Jm + JL)/Kt\}(SMD_0 - SMD_1) \quad (3)$$

This speed feedforward amount FFv is subsequently added to the torque command Tc1 obtained in the aforementioned speed loop processing to obtain a torque command Tc by which the speed feedforward control has been made. Then, the servomotor is driven in response to this torque command Tc.

Figure 2:
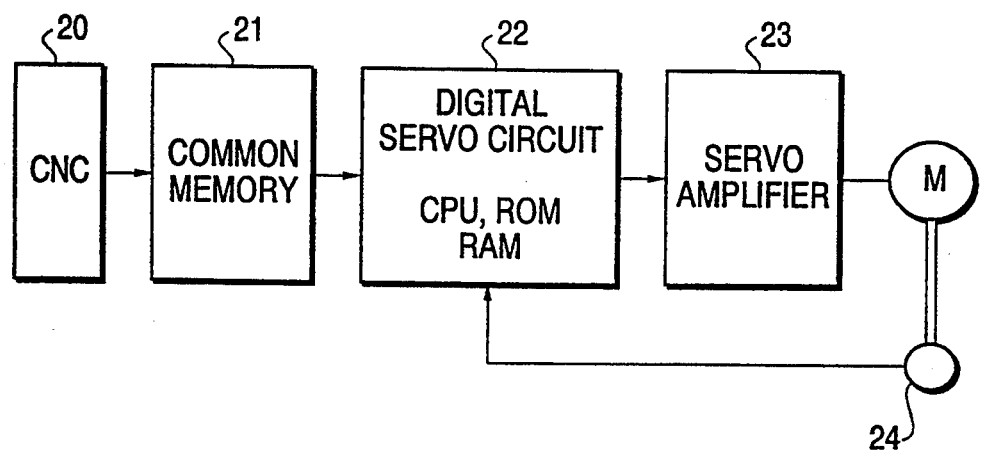
FIG. 2 is a block diagram of the servomotor control system for carrying out the method of the present invention.

FIG. 2 is a block diagram schematically showing a servomotor control system in which the present invention is embodied.

In FIG. 2, a reference numeral 20 represents a numerical control apparatus equipped with a built-in computer (abbreviated as CNC); reference numeral 21, a common RAM; reference numeral 22, a digital servo circuit comprising components such as processor (CPU), ROM, RAM and others; a reference numeral 23, represents a servo amplifier such as a transistor inverter; and reference numeral 24, a pulse coder generating pulse signals in response to rotation of the servomotor M. It should be noted that FIG. 2 discloses only the single-axle servomotor.

The CNC 20 writes a shift command Mcmd into the common RAM 21 in each ITP cycle, while the CPU of the digital servo circuit 22 reads out the shift command Mcmd from the common RAM 21, and executes the position-speed loop processing in each cycle Ts corresponding to 1/N of the ITP cycle (i.e. ITP=Ts×N).

In each ITP cycle, the shift command is obtained in each position-speed loop processing Ts so that the shift command Mcmd outputted from the CNC 20 is evenly divided into the N position-speed loop cycles of the same ITP cycle. The position loop processing is executed in accordance with the difference between the shift command and the actual position of the servomotor M detected by the feedback pulse from the pulse coder 24, and the speed command is obtained by executing the later-explained position feedforward control processing. Then, the speed loop processing and further the speed feedforward processing are executed by utilizing the speed command and the actual speed of the servomotor M detected by the feedback pulse from the pulse coder 24 to obtain the torque command (i.e. operational current command). A PWM command, generated through the current loop processing, is fed through the servo amplifier 23 to the servomotor M to activate it.

Figure 3:
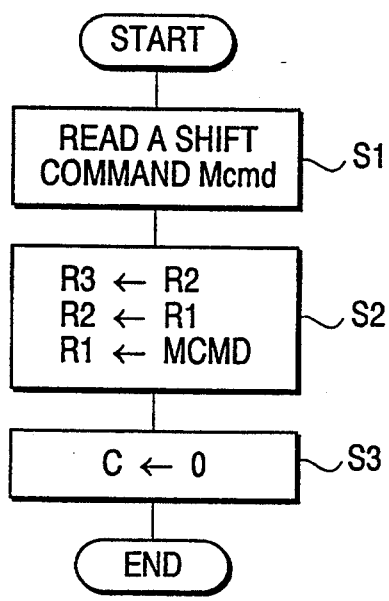
FIG. 3 is a flowchart showing a processing to be performed by a processor of the digital servo circuit shown in FIG. 2 in each distribution cycle of the present invention.

FIG. 3 is a flowchart showing a shift command read processing in each ITP cycle executed in the CPU of the digital servo circuit 22.

The CPU of the digital servo circuit 22 executes the processing of the FIG. 3 in each ITP cycle. The shift command Mcmd supplied from the CNC 20 is first read out from the common memory 21, in step S1. Then, values stored in the registers R1 and R2 are transferred to the registers R2 and R3, respectively. Also, the Mcmd read out in the step S1 is stored in the register R1 in step S2. The registers R1 through R3 store "0" as an initial value. Then, the counter C is set to "0" in step 3. Then, the processing in the present distribution cycle is ended. The above processing is executed in each of the succeeding ITP cycles.

On the other hand, the CPU of the digital servo circuit executes both position loop processing and speed loop processing in each position-speed loop processing cycle Ts, which will be explained below with reference to the flowchart of FIG. 4.

First, the CPU makes a judgement in step A1 as to whether or not the value of the counter C is equal to or less than a half of N (N=ITP cycle/position-speed loop processing cycle), where N is the value obtained by dividing the ITP cycle by the position-speed loop processing cycle. If the value of the counter C is less than a half of N, the CPU proceeds to a step A2 to add to an accumulator SUM the value obtained by subtracting the value of register 3 from value of the register R2. If the value of the counter C exceeds a half of N, the CPU proceeds to step A3 to add to the accumulator SUM the value obtained by subtracting the value of register 1 from the value of the register R2. Then, the CPU proceeds to step A4. An initial value of the accumulator SUM is set to "0".

In the step A4, the CPU obtains the smoothing data $SMD_0$ by dividing the value of accumulator SUM by $N^2$. Then, the CPU proceeds to step A5 to obtain the position feedforward amount FFp by using the above defined equation (2) on the basis of the smoothing data $SMD_0$ obtained in the present position-speed loop cycle in step A4 and one preceding smoothing data SMD1 stored in the register Q. Subsequently, the CPU proceeds to step A6 to add "1" to the counter C. The above explained processing steps A1 through A4 and A6 constitute the procedure for obtaining the smoothing data, which is equivalent to the procedure for averaging the shift commands of respective position-speed loop processing cycles in accordance with the above equation (1). Aforementioned PCT/JP92/00666 and PCT/JP92/01150 disclose this procedure in detail.

Next, in step A7, the shift command for each position-speed loop processing cycle is determined by executing the DDA processing based on the shift command Mcmd stored in the register R2. The shift command Mcmd is not memorized in the register R2 in the first ITP cycle immediately after the operation of the system is initiated; accordingly the shift command of the position-speed loop is "0". In other words, the smoothing processing and the feedforward processing are executed prior to the position-speed operation by one ITP cycle.

In step A8, the CPU obtains the speed command Vc1 by executing the position loop processing. Then, in step A9, the CPU obtains the speed command Vc by adding the position feedforward amount FFp obtained in the step A5 to the speed command Vc1. In step A10, the CPU further obtains the torque command Tc1 by executing the speed loop processing on the bases of the determined speed command Vc and the speed feedback signal. Next, in step A11, the speed feedforward amount FFv is obtained by the above identified equation (3) on the bases of the smoothing data $SMD_0$ of the present cycle and the one smoothing data $SMD_1$ preceding by one cycle and stored in the register Q. Subsequently, in step A12, the determined speed feedforward amount FFv is added to the torque command Tc1 of the step 10 to obtain the torque command Tc as a result of the speed feedforward control. Then, in step A13, the CPU transmits the determined torque command Tc to the current loop. In step A14, the CPU stores the smoothing data $SMD_0$ of the present cycle is stored in the register Q so that it can be used again as a smoothing data $SMD_1$ of one preceding cycle Ts in the next cycle, and the present position-speed loop processing is terminated. The processing defined in FIG. 4 is executed in each position-speed loop processing cycle Ts.

According to the aforementioned embodiment, the position feedforward amount FFp is determined based on the smoothing data $SMD_1$ of one preceding (past) position-speed loop cycle; however, the position feedforward amount FFp may also be determined using a smoothing data of a cycle immediately following (future) position-speed loop cycle. Such a position-speed loop processing, as a second embodiment of the present invention will be described according to a flowchart shown in FIG. 5.

Figure 4:
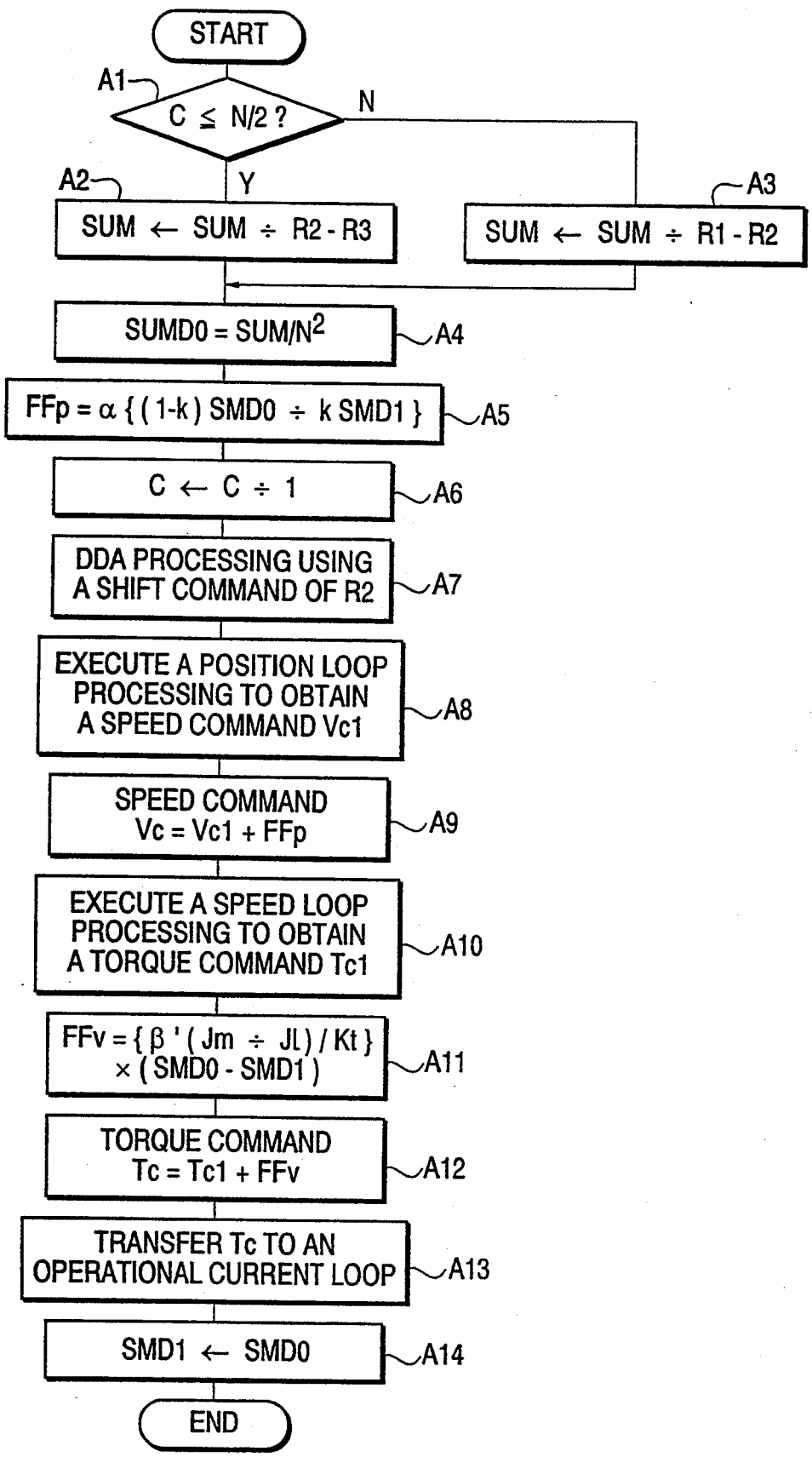
FIG. 4 is a flowchart showing a processing to be performed by the processor of the digital servo circuit in each position-speed loop processing cycle in accordance with the first embodiment of the present invention.
Figure 5:
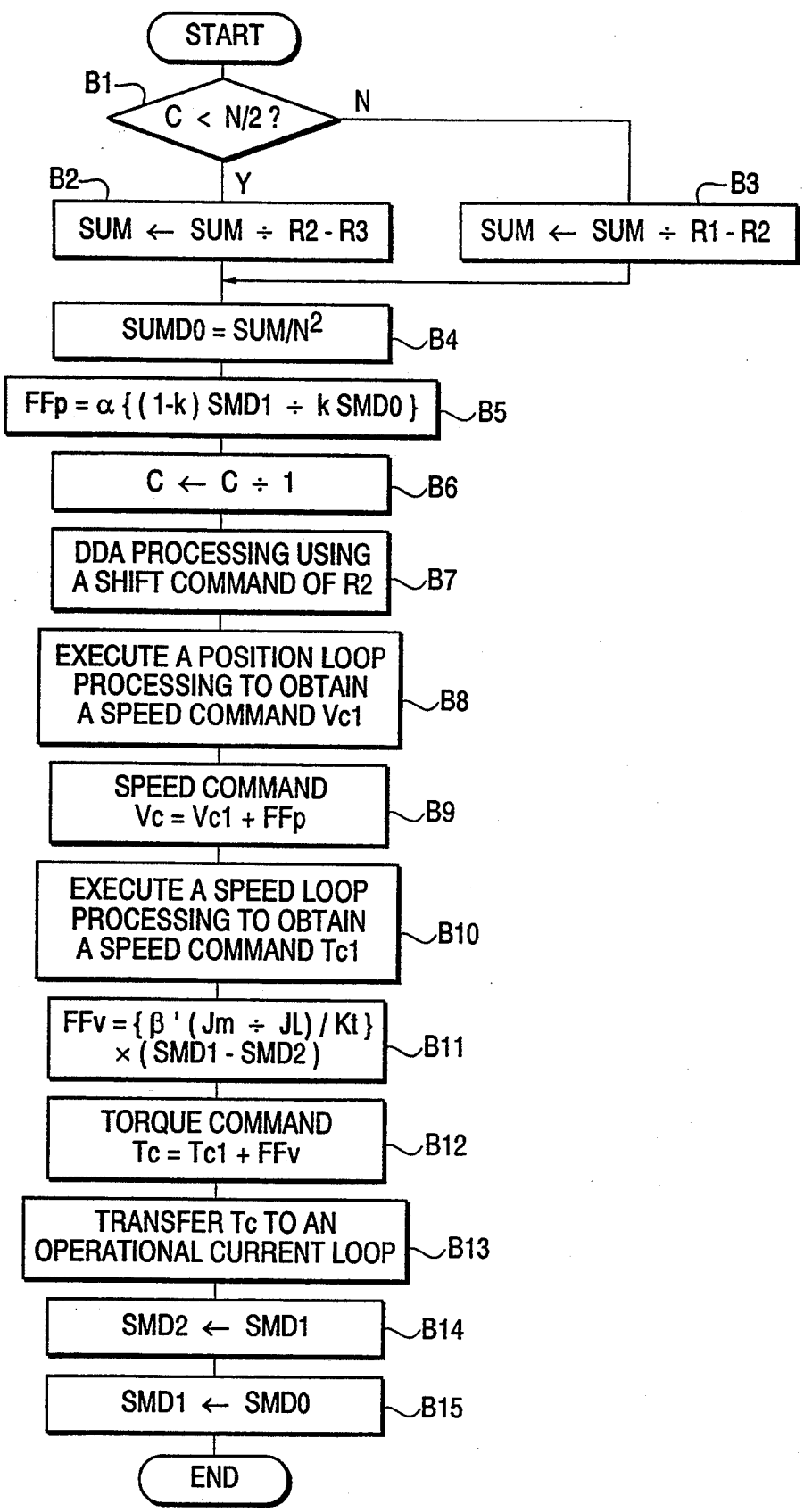
FIG. 5 is a flowchart showing a processing to be performed by the processor of the digital servo circuit in each position-speed loop processing cycle in accordance with the second embodiment of the present invention.

FIG. 5 differs from FIG. 4 in that the steps A1, A5, A11 and A14 of FIG. 4 are replaced by steps B1, B5, B11 and B14 respectively and a step B15 is newly added. In step A1 of FIG. 4, the program proceeds to step A2 when the value of counter C is equal to or less than N/2. In step B1 of FIG. 5 corresponding to step A2, however, the program is designed to proceed to step B2 when the value of counter C is less than N/2 so that the smoothing processing can be advanced by one position-speed loop cycle.

In more detail, the counter C is set to "0" in the beginning of each ITP cycle and is incremented by "1" in each position-speed loop processing cycle (Refer to the steps A6 and B6). Thus, the judgements in the steps A1 and B1 are for determining whether the present position-speed loop cycle belongs to a first half or a second half in the present ITP cycle. If the present position-speed loop processing cycle belongs to the first half, the CPU proceeds to the step A2 or B2. If the present position-speed loop processing cycle belongs to the second half, the CPU proceeds to the step A3 or B3.

The shift command of the position-speed loop is determined according to the shift command Mcmd of the present ITP cycle stored in the register R2 (Refer to steps A7 and B7). The processings in step A3 and B3 are designed not only for adding to the accumulator SUM the difference obtained by subtracting the value of register R3, in which the shift command Mcmd preceding the present ITP cycle by one ITP cycle (past shift command), from the value to be stored in register R2, but also for executing the smoothing processing without causing the shift command of the position-speed loop to largely vary at the time of the change from the shift command in the immediately preceding ITP cycle to that in the present ITP cycle. On the other hand, the smoothing processing of the steps A3 and B3 are for the smooth transfer of the shift command of the present ITP cycle to that of the following ITP cycle (future). That the processing in step B1 allows the processing of step B2 to proceed to the processing of step B3 preceding by one cycle the processing of step A1 means that the processing described in FIG. 5 is executed preceding the processing described in FIG. 4 by one position-speed loop cycle.

Then, in the step B5, the feedforward amount FFp is determined according to the following equation (4).

$$FFp = \alpha\{(1-k) SMD_1 + kSMD_0\} \qquad (4)$$

In the equation (4), $SMD_1$ is the smoothing data obtained in the preceding cycle, while $SMD_0$ is the smoothing data obtained in the present cycle. This equation (4) differs from the equation (2) in that the $SMD_1$ in the former is replaced with $SMD_0$ in the latter. As described above, the $SMD_1$ of the equation (4) corresponds to the $SMD_0$ of the equation (2), since the smoothing processing in B1-B4 is advanced by one cycle Ts compared with the smoothing processing in A1-A4 of FIG. 4. The $SMD_0$ of the equation (4) is a smoothing data preceding the $SMD_1$ of the equation (4) by one cycle Ts, or it refers to the smoothing data $SMD_{-1}$ (future) advanced by one cycle Ts from the $SMD_0$ of equation (2). An ordinary position-speed loop processing is carried out in the same manner in each procedure of the steps A7, A8, A10 and the steps B7, B8, B10. Thus, compared with the processing of FIG. 4, the position feedforward amount FFp in the processing of FIG. 5 is determined on the bases of the smoothing data ($SMD_1$) of the present cycle and the smoothing data ($SMD_0$) of the cycle later by one cycle (future).

Then, upon determination of the position feedforward amount FFp, the CPU executes the steps B6-B10 corresponding to the processing of the steps A6-A10 to obtain the torque command Tc1.

The speed feedforward amount FFv is determined according to the following equation (5), where $SMD_1$ represents the smoothing data of the present cycle stored in register Q1, and $SMD_2$ represents the smoothing data of the preceding (past) cycle stored in the register Q2 (Step B11).

$$FFv = \{\beta' (Jm+JL)/Kt\} (SMD_1 - SMD_2) \qquad (5)$$

The determined speed feedforward amount FFv is added to the torque command Tc1 obtained in the step B10 to determine the torque command Tc as a result of the feedforward processing (Step B12). Then, this torque command Tc to the current loop. Thereafter, the smoothing data $SMD_2$ stored in the resister Q2 is replaced by the smoothing data $SMD_1$ stored in the register Q1, and the smoothing data $SMD_1$ stored in the register Q1 is replaced by the smoothing data $SMD_0$ obtained in the step B4, thereby terminating the present position-speed loop processing. The above-described processing will be repeated in each position-speed loop processing cycle.

The above embodiments include the speed feedforward control together with the position feedforward control; however, the speed feedforward control can be omitted.

Figure 6A:
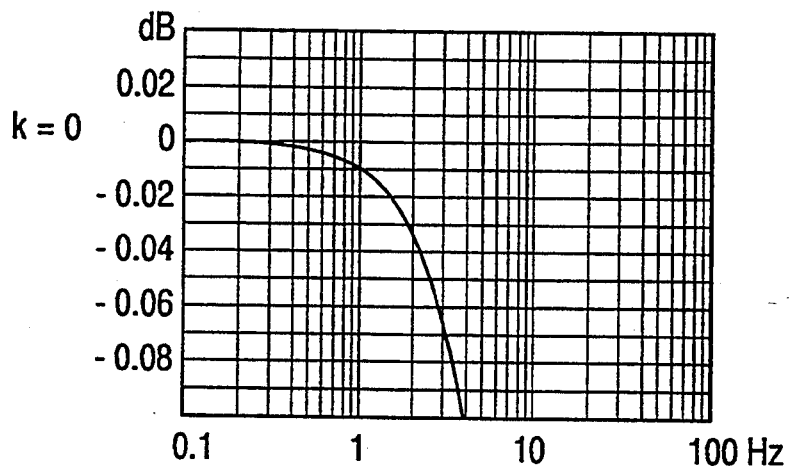
FIGS. 6(a) through 6(c) are graphs showing the position loop gain characteristic tested in accordance with the first embodiment, wherein the parameter k for correcting dynamic characteristics of the machine is varied.
Figure 6B:
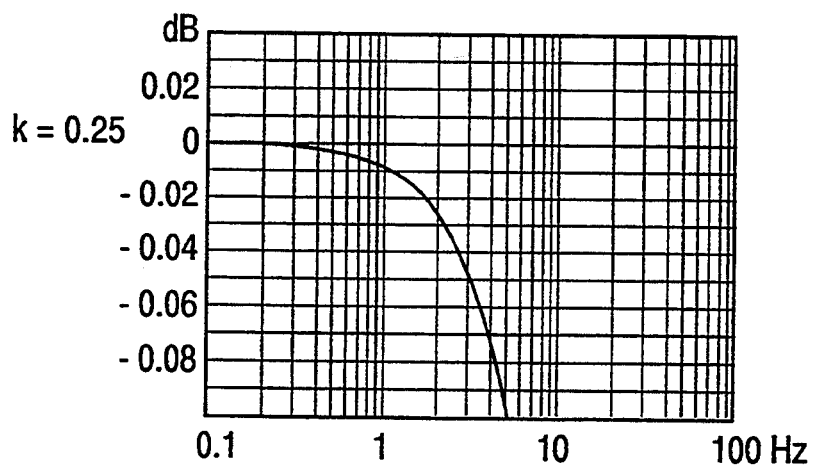
Figure 6C:
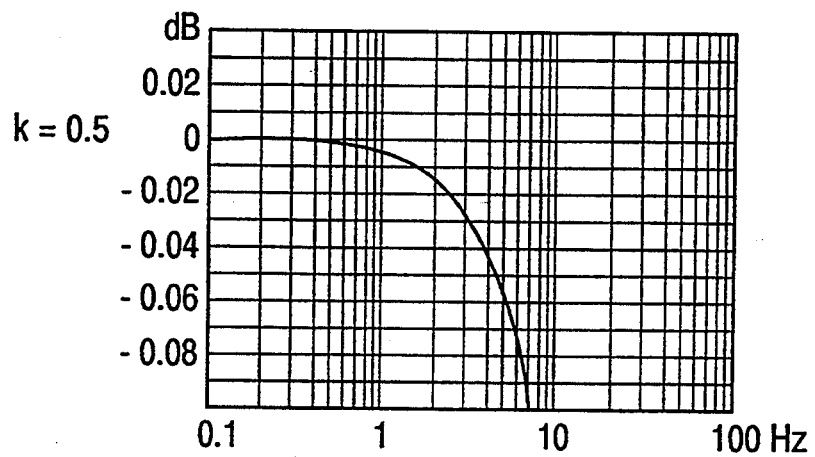

FIGS. 6(a), 6(b) and 6(c) show the test data showing position loop gain characteristics obtained by experiments in which the parameter k is varied for correcting the dynamic characteristics. FIG. 6(a) shows the position loop gain characteristics in case of k=0. FIGS. 6(b) and 6(c) show the position loop gain characteristics where k=0.25 and k=0.5, respectively.

Figure 7:
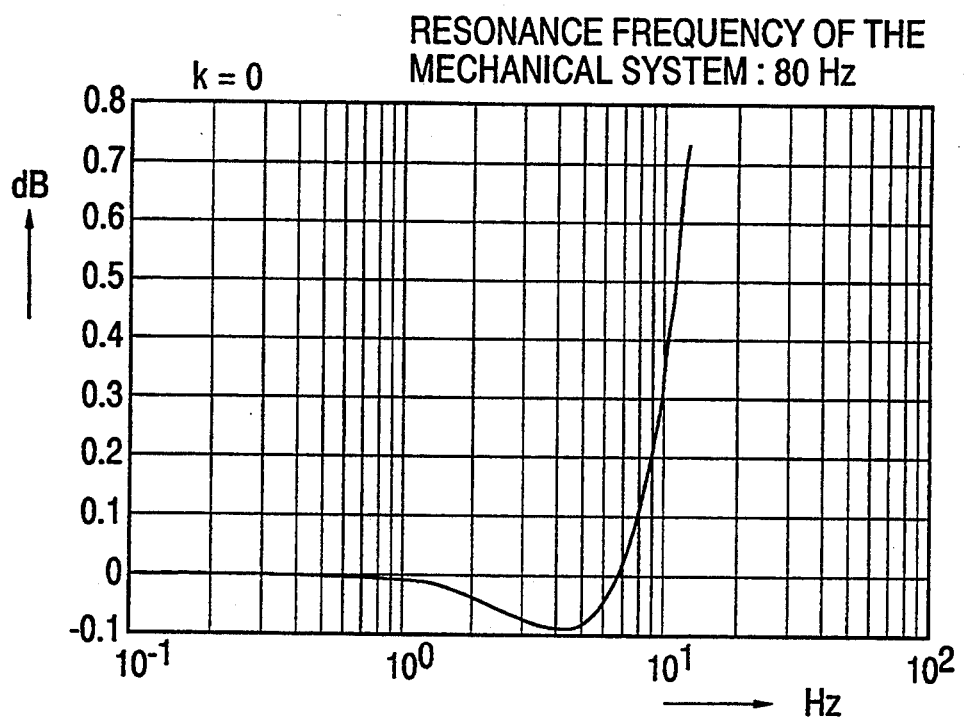
FIG. 7 is a graph showing the response characteristics in the simulation in accordance with the first embodiment, wherein the resonance frequency of the machine system is set to 80 Hz, and the parameter k to "0"
Figure 8:
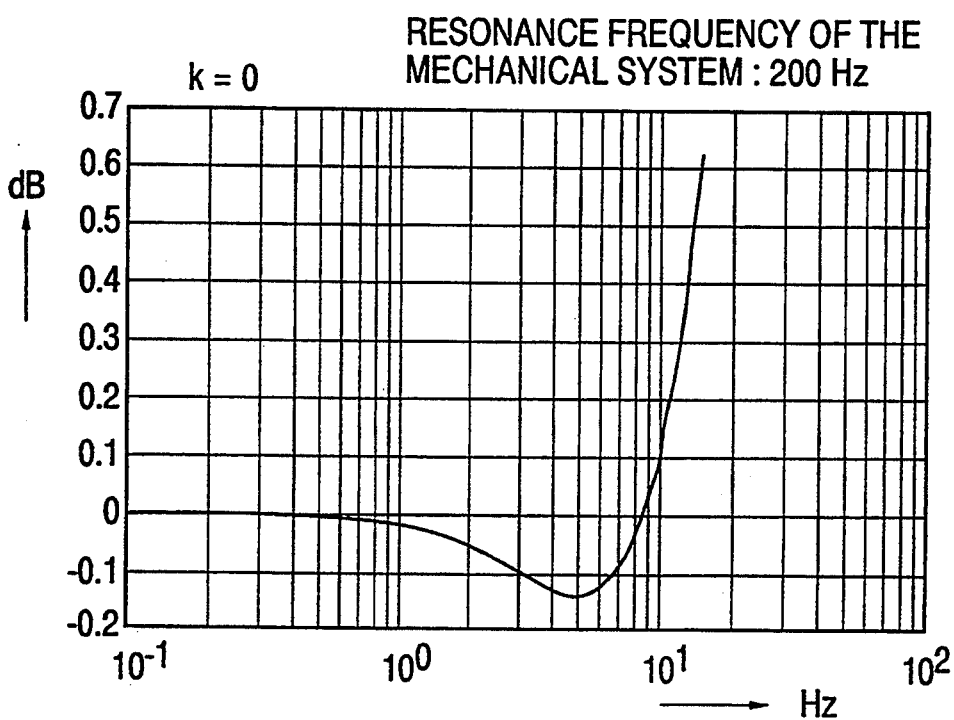
FIG. 8 is a graph showing the response characteristics in the simulation in accordance with the first embodiment, wherein the resonance frequency of the machine system is set to 200 Hz, and the parameter k is set to "0"
Figure 9:
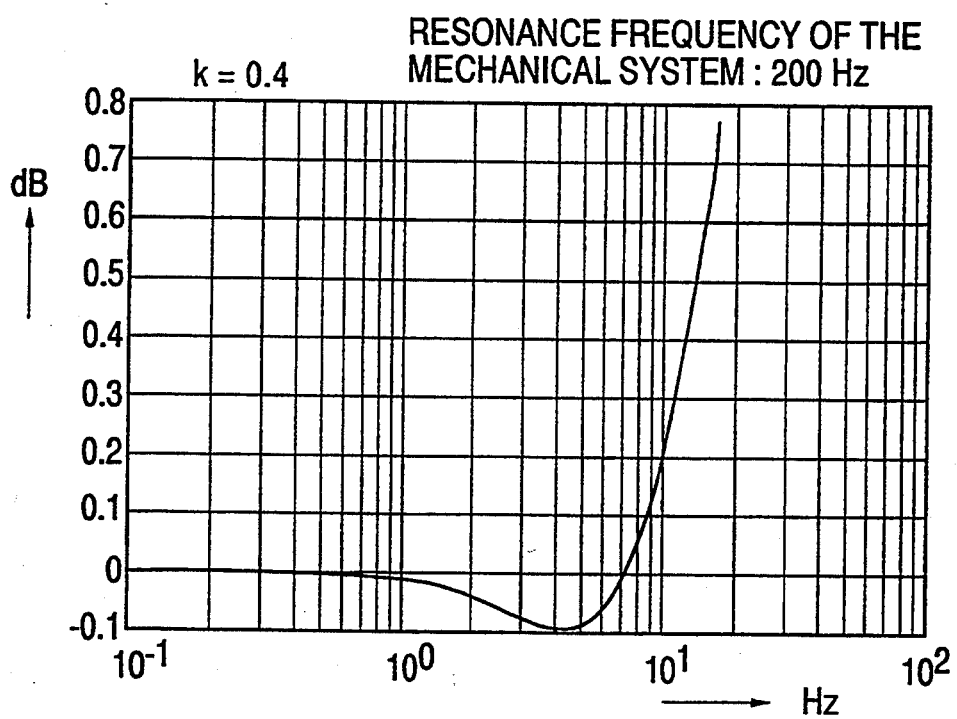
FIG. 9 is a graph showing the response characteristics in the simulation in accordance with the first embodiment, wherein the resonance frequency of the machine system is set to 200 Hz, and the parameter k to "0.4".

Furthermore, FIGS. 7, 8 and 9 show response characteristics as a result of simulation of the case where there is the torsion between the servomotor and the machine (axle) connected to each other to represent the difference in the machine characteristics.

FIGS. 7 and 8 show the response characteristics obtained by the simulation of the cases where the value of the parameter k is set to "0". FIG. 7 shows the case where the machine has a resonance frequency of 80 Hz, while FIG. 8, the case where the machine has a resonance frequency of 200 Hz. As are obvious from FIGS. 7 and 8, the difference in rigidity (and torsion) of respective machines causes the difference of response characteristic.

On the other hand, FIG. 9 shows the response characteristic where the machine has a resonance frequency of 200 Hz and the parameter k is set to 0.4. As is obvious from comparison the response characteristics shown in FIGS. 7 and 9 are substantially the same. This means that, even if the machines have mutually different dynamic characteristics, it is possible to obtain substantially the same response characteristics by adjusting the parameter k to equalize the dynamic characteristics of individual machines including the servo control circuit with respect to the operation command.

According to the present invention, the response characteristics of individual machines can substantially be equalized with respect to the operation command by determining the position feedforward amount through adjusting the aforementioned parameter k even if machines, constituting a mechanical system to be driven by servomotors, have different dynamic characteristics.

Thus, even in the case where a plurality of mechanical systems having different dynamic characteristics are simultaneously interpolated for their operations, it is possible to realize accurate control and operation of such mechanical systems, since the response characteristics of the machines constituting the mechanical systems can be adjusted for being substantially identical with each other. Therefore, the present invention, when applied to a machine tool, can contribute to the considerable improvement in the machining accuracy.

I claim:

1. A method for controlling a servomotor by executing both a position loop processing and a speed loop processing, in a position and speed loop cycle, on the basis of a shift command supplied from a numerical control apparatus in each distribution cycle, comprising the steps of:
    (a) obtaining a smoothing data for each of a plurality of position and speed loop cycles by executing an advance smoothing processing including averaging a plurality of successive shift commands corresponding to said plurality of position and speed loop cycles;
    (b) calculating a position feedforward amount FFp according to the following equation:

$$FFp = \alpha\{(1-k)\,SMD_0 + k.SMD_1\}$$

where $SMD_0$ represents the obtained smoothing data corresponding to a present said position and speed loop cycle of the position-speed loop processing, $SMD_1$ represents the obtained smoothing data corresponding to a preceding said position and speed loop cycle of the position-speed loop processing, $\alpha$ represents a feedforward coefficient, and k represents a parameter which is determined to obtain desired dynamic characteristics of a machine to be driven with the servomotor in response to a shift command;
    (c) correcting a speed command obtained in the position loop processing based on the position feedforward amount FFp obtained in said step (b); and
    (d) transmitting said corrected speed command to the speed loop processing.

2. A method for controlling a servomotor in accordance with claim 1, further comprising the steps of:
    differentiating the smoothing data obtained in said step (a) to obtain a speed feedforward amount; and
    correcting a torque command obtained by the speed loop processing based on the speed feedforward amount.

3. A method for controlling a servomotor by executing both a position loop processing and a speed loop processing, in a position and speed loop cycle, on the basis of a shift command supplied from a numerical control apparatus in each distribution cycle, comprising the steps of:
    (a) obtaining a smoothing data for each of a plurality of position and speed loop cycles by executing an advance smoothing processing including averaging a plurality of successive shift commands corresponding to said plurality of position and speed loop cycles;
    (b) calculating a position feedforward amount FFp according to the following equation:

$$FFp = \alpha\{(1-k)\,SMD_0 + k.SMD_{-1}\}$$

where $SMD_0$ represents the obtained smoothing data corresponding to a present said position and speed loop cycle, $SMD_{-1}$ represents the obtained smoothing data corresponding to a delayed said position and speed loop cycle, $\alpha$ represents a feedforward coefficient, and k represents a parameter which is determined to obtain desired dynamic characteristics of a machine to be driven with the servomotor in response to a shift command;
    (c) correcting a speed command obtained in the position loop processing based on the position feedforward amount FFp obtained in said step (b); and
    (d) transmitting said corrected speed command to the speed loop processing.

4. A method for controlling a servomotor in accordance with claim 3, further comprising the steps of:
    differentiating the smoothing data obtained in said step (a) to obtain a speed feedforward amount; and
    correcting a torque command obtained in the speed loop processing based on the speed feedforward amount.

* * * * *